United States Patent
Ueki

(10) Patent No.: US 11,714,989 B2
(45) Date of Patent: Aug. 1, 2023

(54) RFIC MODULE, RFID TAG, AND ARTICLE

(71) Applicant: Murata Manufacturing Co., Ltd., Nagaokakyo (JP)

(72) Inventor: Noriyuki Ueki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 2 days.

(21) Appl. No.: 17/652,339

(22) Filed: Feb. 24, 2022

(65) Prior Publication Data
US 2022/0180145 A1 Jun. 9, 2022

Related U.S. Application Data

(63) Continuation of application No. PCT/JP2021/001212, filed on Jan. 15, 2021.

(30) Foreign Application Priority Data

May 15, 2020 (JP) .................................. 2020-085819

(51) Int. Cl.
*G06K 19/077* (2006.01)
*H01Q 1/22* (2006.01)

(52) U.S. Cl.
CPC ..... *G06K 19/07773* (2013.01); *H01Q 1/2208* (2013.01)

(58) Field of Classification Search
CPC ........................ G06K 19/07773; H01Q 1/2208
USPC ........................................................ 235/492
See application file for complete search history.

(56) References Cited

U.S. PATENT DOCUMENTS

2021/0111493 A1* 4/2021 Yazaki ................. H01Q 1/2225
2021/0313696 A1* 10/2021 Chang ..................... B32B 7/025
2022/0398389 A1* 12/2022 Hasegawa .......... G06K 7/10316

FOREIGN PATENT DOCUMENTS

WO    2009142114 A1    11/2009
WO    2018079718 A1    5/2018
WO    2019004439 A1    1/2019

OTHER PUBLICATIONS

International Search Report issued for PCT/JP2021/001212, dated Mar. 9, 2021.

* cited by examiner

*Primary Examiner* — Allyson N Trail
(74) *Attorney, Agent, or Firm* — ArentFox Schiff LLP

(57) ABSTRACT

An RFIC module includes an insulating substrate; a stacked coil formed into a plurality of layers in the insulating substrate and formed along four side surfaces of the insulating substrate; an RFIC mounted on a first planar surface of the insulating substrate; and a planar coil disposed on a second planar surface of the insulating substrate, that partially has an open portion, and that overlaps the stacked coil in a plan view of the insulating substrate. The stacked coil is connected to the RFIC. The RFIC is disposed at a position close to a first side surface and close to a third side surface of the insulating substrate. A part of the RFIC overlaps the stacked coil in a plan view of the insulating substrate. The open portion of the planar coil is formed at a position close to the first side surface.

20 Claims, 15 Drawing Sheets

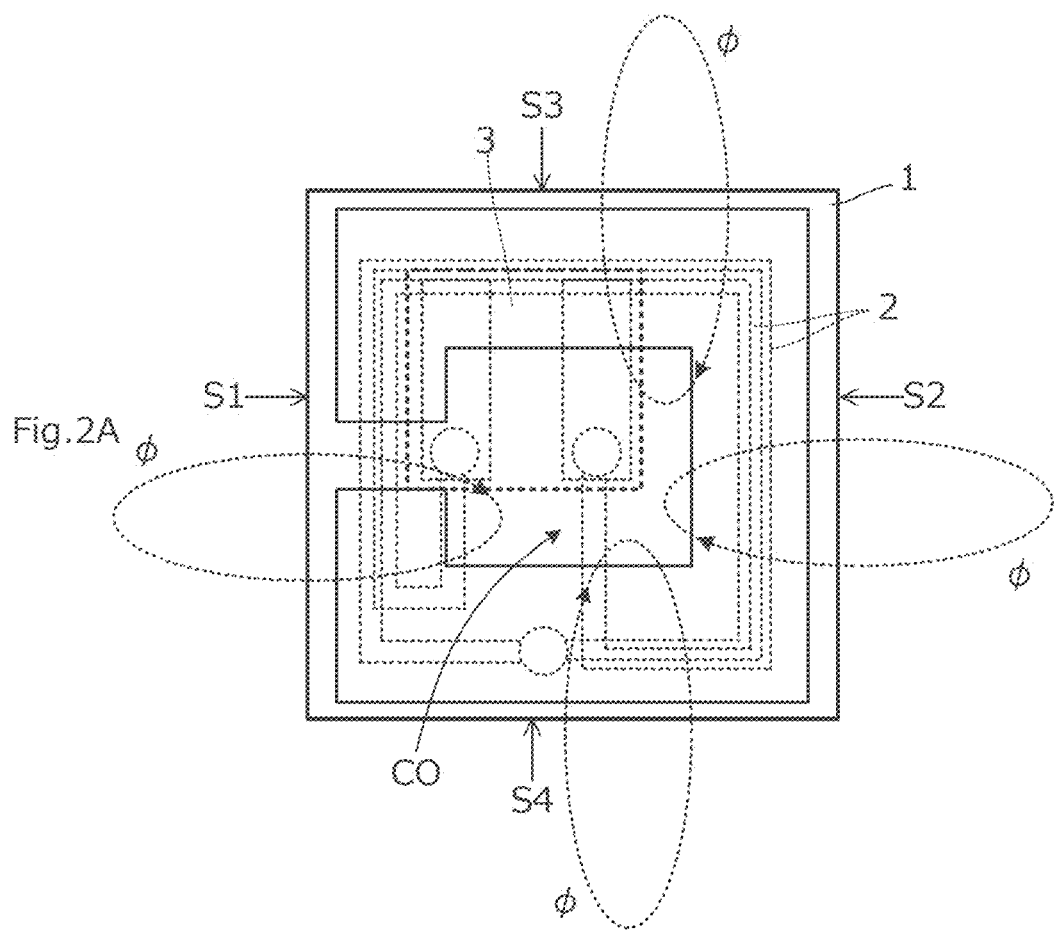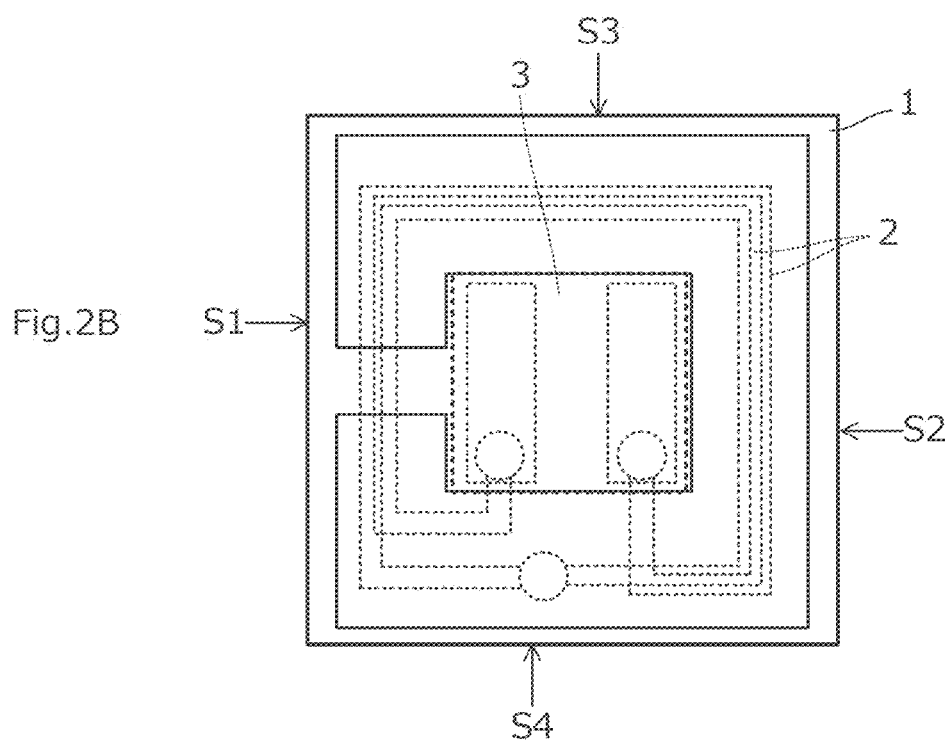

RFIC MODULE, RFID TAG, AND ARTICLE

CROSS REFERENCE TO RELATED APPLICATIONS

The present application is a continuation of PCT/JP2021/001212 filed Jan. 15, 2021, which claims priority to Japanese Patent Application No. 2020-085819, filed May 15, 2020, the entire contents of each of which are incorporated herein by reference.

TECHNICAL FIELD

The present invention relates to a radio frequency integrated circuit (RFIC) module having an integrated circuit (IC) that processes high frequency signals, and relates to a radio frequency identification (RFID) tag including the RFIC module, and an article.

BACKGROUND

WO 2018/079718 A (hereinafter "Patent Literature 1") describes an example of an antenna-mounted communication IC unit used as an RFID tag.

The antenna-mounted communication IC unit disclosed in Patent Literature 1 includes an antenna unit in which substrates on which a coil is formed are stacked; and an IC chip connected to the antenna unit. The antenna unit disclosed therein includes a main element in which a plurality of coils are series-connected; and a sub-element including a coil having an open portion and less than one turn. The main element and the sub-element are disposed so as to be electromagnetically coupled. In addition, Patent Literature 1 discloses an antenna-mounted communication IC unit including a conductor having a cut-out portion, with the open portion of the sub-element is stacked on the cut-out portion of the conductor.

In the communication IC unit described in Patent Literature 1, in order to reduce the sizes of the main element and the sub-element, a coil opening of each coil should be reduced, but the IC chip cannot be reduced. Therefore, as the communication IC unit is made smaller, the size of the coil opening of each coil becomes closer to the area of the IC chip. As a result, the coil opening of each coil is magnetically blocked by the IC chip and a mounting electrode for the IC chip, and the communication performance decreases accordingly.

SUMMARY OF THE INVENTION

Therefore, it is an object of the present invention to provide an RFIC module that is downsized while reducing blocking of a coil opening by an IC chip and reducing deterioration of communication performance. Moreover, an RFID tag and an article is provided that includes the RFIC module.

In an exemplary aspect, a radio frequency integrated circuit (RFIC) module is provided that includes an insulating substrate having a cuboid shape that includes a first side surface and a second side surface that are parallel to a Y-axis direction perpendicular to an X-axis direction, a third side surface and a fourth side surface that are parallel to the X-axis direction, and a first planar surface and a second planar surface that are parallel to the X-axis direction and the Y-axis direction. Moreover, a stacked coil is provided that is configured with conductor patterns that are formed into a plurality of layers in the insulating substrate and formed along the first side surface, the second side surface, the third side surface, and the fourth side surface of the insulating substrate. A radio frequency integrated circuit (RFIC) is mounted on the first planar surface of the insulating substrate; and a planar coil is formed on the second planar surface of the insulating substrate and has, on a part of the planar coil, an open portion having a cut out shape, and that overlaps the stacked coil when viewed in a direction perpendicular to the first planar surface of the insulating substrate. In the exemplary aspect, the stacked coil and the RFIC are connected to each other, the RFIC is disposed at a position closer to the first side surface than to the second side surface and closer to the third side than to the fourth side surface, a part of the RFIC overlaps the stacked coil when viewed in a direction perpendicular to the first planar surface of the insulating substrate, and the open portion of the planar coil is formed at a position closer to the first side surface than to the second side surface.

In the RFIC module having the above configuration of the exemplary aspect, since the RFIC is disposed at a position closer to the first side surface than to the second side surface and the third side surface than to the fourth side surface, blocking of the coil opening of the stacked coil by the RFIC is reduced. In addition, since the part of the RFIC overlaps the stacked coil when viewed in a direction perpendicular to the first planar surface of the insulating substrate, the area of the coil opening that is not blocked by the RFIC or by a mounting electrode is therefore secured.

Moreover, an RFID tag of the present disclosure includes the above RFIC module; and a planar conductor partially having a recess in a cut out shape in the planar direction, and the open portion of the planar coil overlapping the recess of the planar conductor when viewed in a direction perpendicular to the first planar surface of the insulating substrate of the RFIC module.

In the RFID tag having the above configuration according to the exemplary aspect, the planar conductor is configured to function as a part of a radiation element.

Yet further, an article of an exemplary aspect includes the above RFIC module; and a planar conductor. In this aspect, the planar conductor partially has a recess in a cut out shape in the planar direction, and the open portion of the planar coil overlaps the recess of the planar conductor when viewed in a direction perpendicular to the first planar surface of the insulating substrate.

In the article of the present disclosure, the planar conductor included in the article is configured to function as a part of the radiation element.

With the exemplary aspects of the present invention, a downsized RFIC module is provided in which the blocking of the coil opening by the RFIC and the mounting electrode for the RFIC is reduced, and deterioration of communication performance is reduced. In addition, a small-sized RFID tag and article that have the RFIC module are provided.

BRIEF DESCRIPTION OF DRAWINGS

FIG. 2A is a plan view illustrating magnetic fluxes passing through a coil opening of a stacked coil 2 in an RFIC module of the present exemplary embodiment. FIG. 2B is a plan view illustrating a positional relationship between the stacked coil 2 and an RFIC 3 in an RFIC module as a comparative example.

DETAILED DESCRIPTION OF EMBODIMENTS

First Exemplary Embodiment

Figure 1A:
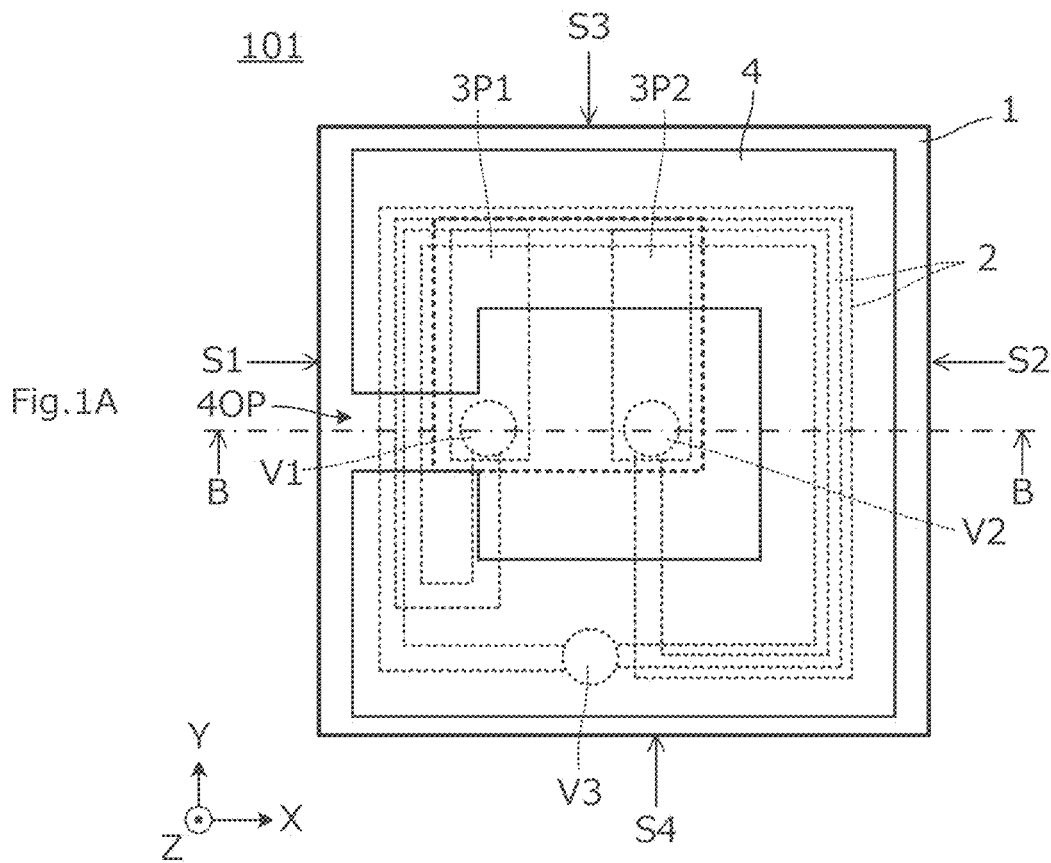
FIG. 1A is a plan view of an RFIC module 101 according to a first exemplary embodiment.
Figure 1B:
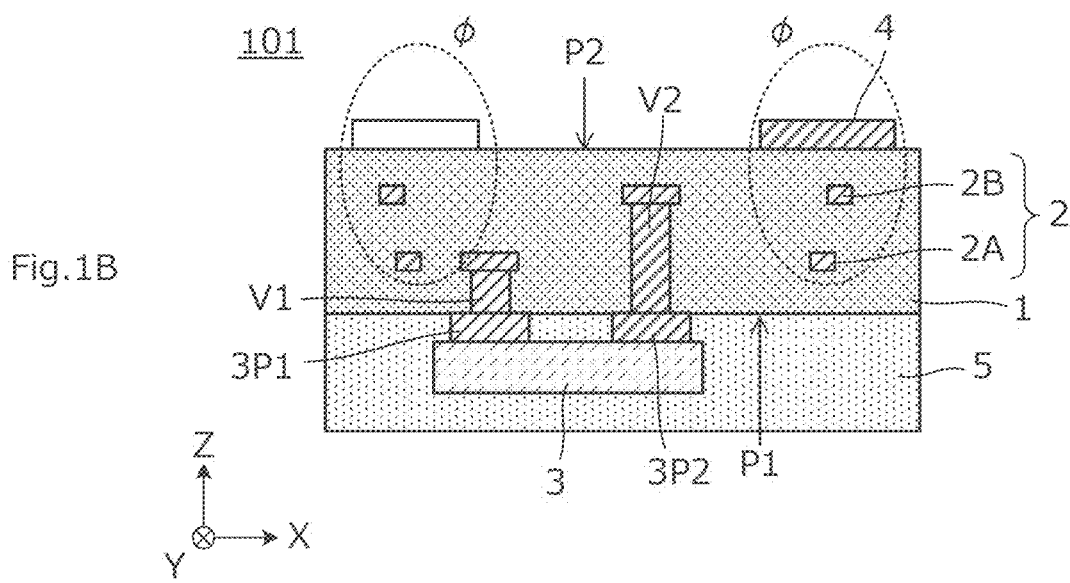
FIG. 1B is a cross-sectional view taken along part B-B in FIG. 1A.

FIG. 1A is a plan view of an RFIC module 101 according to a first exemplary embodiment, and FIG. 1B is a cross-sectional view taken along part B-B in FIG. 1A.

As shown, the RFIC module 101 includes: an insulating substrate 1 having a cuboid shape; a stacked coil 2 formed of a conductor pattern, on the insulating substrate 1; an RFIC 3 mounted on a first planar surface P1 of the insulating substrate 1; and a planar coil 4 formed on the insulating substrate 1.

In an exemplary aspect, the insulating substrate 1 is a plastic base such as a glass-epoxy substrate. Moreover, the insulating substrate 1 has a first side surface S1 and a second side surface S2 that are parallel to a Y-axis direction orthogonal to an X-axis direction; a third side surface S3 and a fourth side surface S4 that are parallel to the X-axis direction; and a first planar surface P1 and a second planar surface P2 that are parallel to the X-axis direction and the Y-axis direction.

The stacked coil 2 is configured with a conductor pattern formed into a plurality of layers in the insulating substrate 1 and is formed along the first side surface S1, the second side surface S2, the third side surface S3, and the fourth side surface S4 of the insulating substrate 1.

The planar coil 4 is formed on the second planar surface P2 of the insulating substrate 1. As shown in FIG. 1A, the planar coil 4 has, on apart of the planar coil 4, an open portion 4OP having a shape of being cut out, i.e., a cut out shape. In addition, the planar coil 4 overlaps the stacked coil 2 when viewed in a direction perpendicular to the first planar surface P1 of the insulating substrate 1.

The stacked coil 2 is configured with conductor patterns 2A and 2B each formed on a predetermined layer of the insulating substrate 1; and via conductors V1, V2, and V3. On the first planar surface P1 of the insulating substrate 1, there are formed mounting electrodes 3P1 and 3P2 for the RFIC 3 to be mounted thereto. The mounting electrode 3P1 is electrically connected to one end of the conductor pattern 2A via the via conductor V1, and the mounting electrode 3P2 is electrically connected to one end of the conductor pattern 2B via the via conductor V2. The other ends of the conductor patterns 2A and 2B are electrically connected to each other via the via conductor V3. In this manner, the stacked coil 2 having substantially two turns is connected to the RFIC 3. The conductor patterns 2A and 2B are both a patterned copper foil, for example, in an exemplary aspect.

The RFIC 3 is disposed at a position closer to the first side surface S1 than to the second side surface S2 and closer to the third side surface S3 than to the fourth side surface S4. In addition, when viewed in a direction perpendicular to the first planar surface P1 of the insulating substrate 1, a part of the RFIC 3 overlaps the stacked coil 2. Moreover, on the first planar surface P1 of the insulating substrate 1, there is provided a plastic mold material layer 5.

The open portion 4OP of the planar coil 4 is provided at a position closer to the first side surface S1 than to the second side surface S2 as shown in FIG. 1A.

As depicted by magnetic fluxes φ in FIG. 1B, the stacked coil 2 and the planar coil 4 are electromagnetically coupled to each other. The magnetic fluxes φ are magnetic fluxes passing through a coil opening of the stacked coil 2 and a coil opening of the planar coil 4.

FIG. 2A is a plan view illustrating a magnetic fluxes φ passing through the coil opening of the stacked coil 2 in the RFIC module of the present embodiment. FIG. 2B is a plan view illustrating a positional relationship between a stacked coil 2 and an RFIC 3 in an RFIC module as a comparative example.

In the comparative example illustrated in FIG. 2B, since the RFIC 3 is coaxially arranged at the center of the coil opening of the stacked coil 2, the coil opening CO of the stacked coil 2 is magnetically blocked by the RFIC 3, and the communication performance is accordingly low.

On the other hand, in the RFIC module of the present embodiment, since the RFIC 3 is disposed at a position closer to a first side surface S1 than a to second side surface S2 and closer to a third side surface S3 than to a fourth side surface S4, blocking of a coil opening CO of the stacked coil 2 by the RFIC 3 and mounting electrodes 3P1 and 3P2 for the RFIC 3 is reduced. In addition, since a part of the RFIC 3 overlaps the stacked coil 2 when viewed in a direction perpendicular to a first planar surface P1 of the insulating substrate 1, the area of the coil opening CO that is not blocked by the RFIC 3 is therefore secured. The broken lines in FIG. 2A represents the magnetic fluxes φ passing through the coil opening CO.

Figure 3:
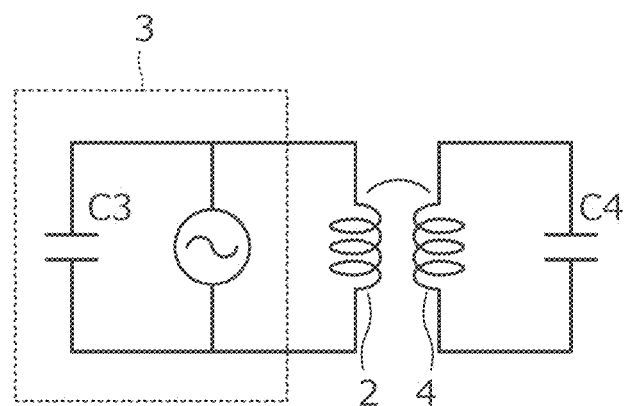
FIG. 3 is an equivalent circuit diagram of the RFIC module 101.

FIG. 3 is an equivalent circuit diagram of the RFIC module 101 in an exemplary aspect. The RFIC 3 can be depicted by a power supply circuit and a capacitor C3 parallel-connected to the power supply circuit. The RFIC 3 is connected to the stacked coil 2. The stacked coil 2 and the capacitor C3 of the RFIC 3 form a first resonance circuit. On the open portion 4OP of the planar coil 4, there is configured a capacitor C4, and inductance generated in the planar coil 4 and capacitance generated on the open portion 4OP constitute a second resonance circuit. The resonance frequency of the first resonance circuit and the resonance frequency of the second resonance circuit are the same or close to each other. In addition, the stacked coil 2 and the planar coil 4 are electromagnetically coupled to each other. Further, the first resonance circuit and the second resonance circuit are coupled to each other. In an exemplary aspect, the frequency of communication signals processed by the RFIC 3 is in a 900 MHz band (860 MHz to 960 MHz), for example.

Second Exemplary Embodiment

A second exemplary embodiment exemplifies an RFID tag and an article.

Figure 4:
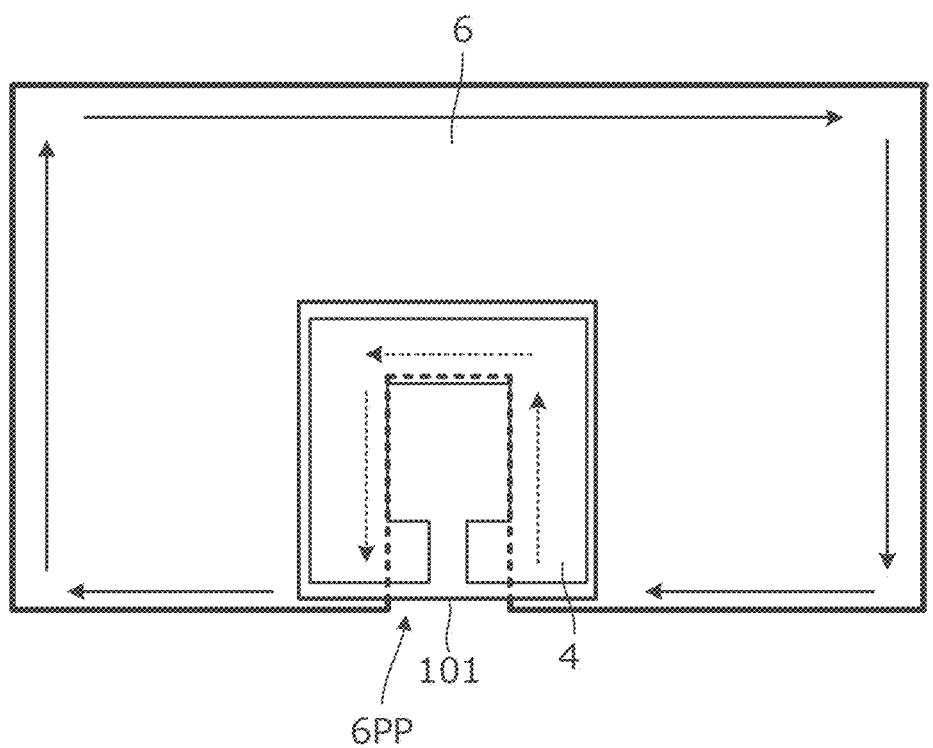
FIG. 4 is a plan view of an RFID tag 201 according to a second embodiment.

FIG. 4 is a plan view of an RFID tag 201 according to the second embodiment. The RFID tag 201 includes an RFIC module 101 and a planar conductor 6. A configuration example of the RFIC module 101 is the same as that described in the first embodiment. The planar conductor 6 partially has a recess 6PP having a shape of being cut out in the planar direction.

Figure 5A:
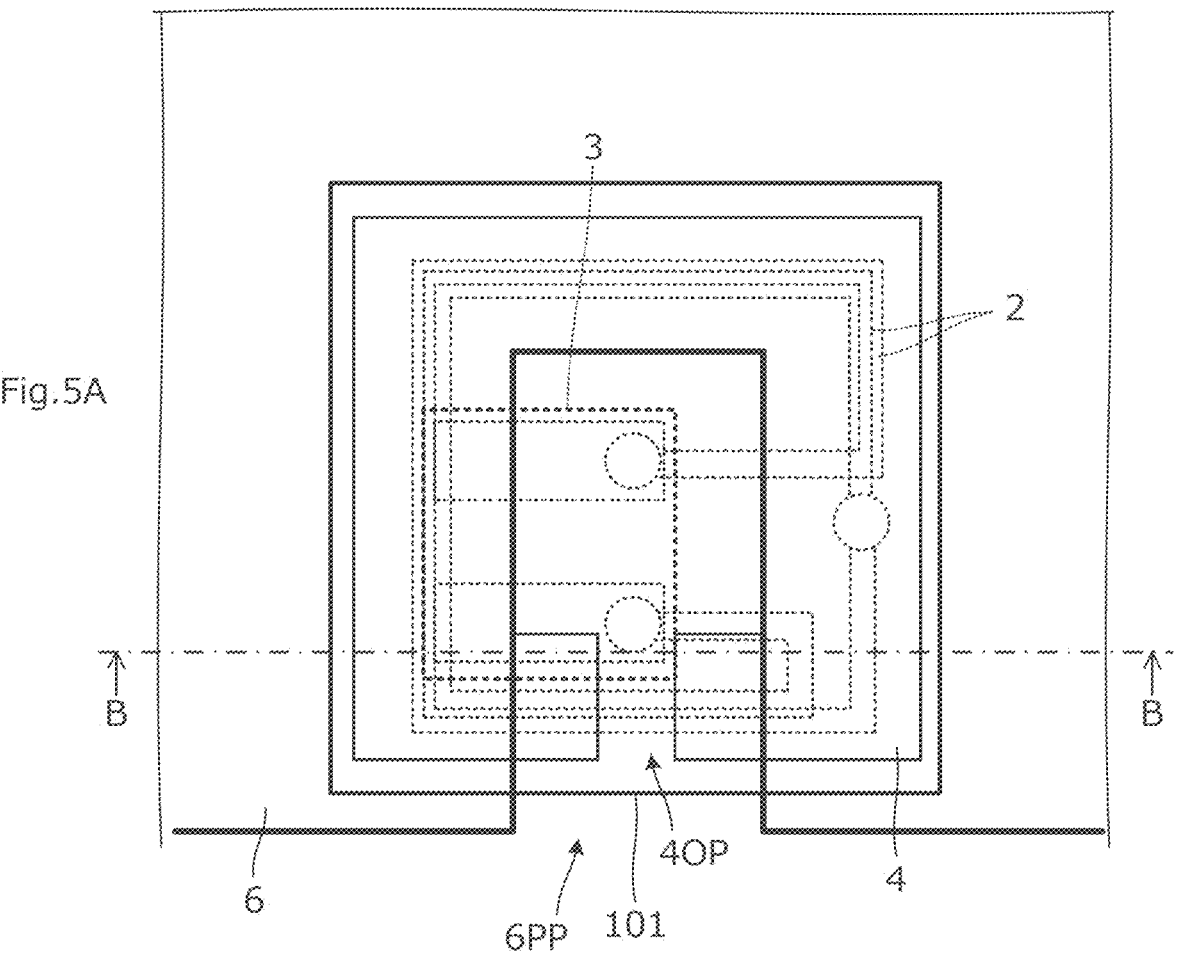
FIG. 5A is a partial plan view illustrating a positional relationship between a recess 6PP of a planar conductor 6 and the RFIC module 101.
Figure 5B:
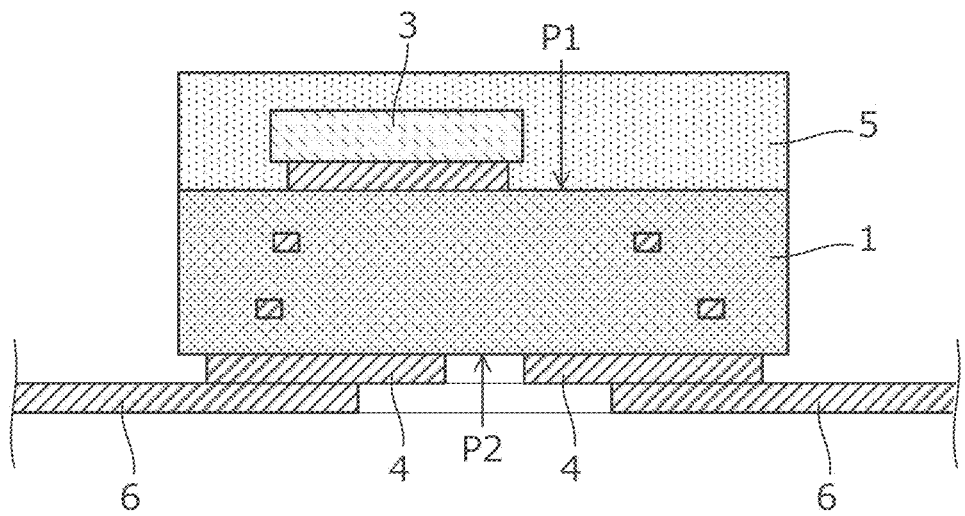
FIG. 5B is a cross-sectional view taken along part B-B in FIG. 5A.

FIG. 5A is a partial plan view illustrating a positional relationship between the recess 6PP of the planar conductor 6 and the RFIC module 101. FIG. 5B is a cross-sectional view taken along part B-B in FIG. 5A.

As shown in FIG. 5A, when viewed in a direction perpendicular to the first planar surface P1 of the insulating substrate 1, an open portion 4OP of a planar coil 4 overlaps the recess 6PP of the planar conductor 6.

In the RFID tag 201, a magnetic field of the planar coil 4 and a magnetic field due to an eddy current generated in the planar conductor 6 are coupled. Therefore, the planar conductor 6 is taken as a part of a coil, and a substantial reception area of the antenna is increased, so that communication performance is improved. At this time, since no eddy current flows in the recess 6PP of the planar conductor 6 (because the eddy current flows around the recess 6PP), the magnetic field in the recess 6PP is weak. Since the open portion 4OP of the planar coil 4 overlaps the recess 6PP of the planar conductor 6, the RFIC 3 is positioned at a place where a magnetic field intensity is weak, such that this configuration minimizes an adverse effect of the RFIC 3 on a magnetic field coupling between the planar coil 4 and the planar conductor 6.

Figure 6A:
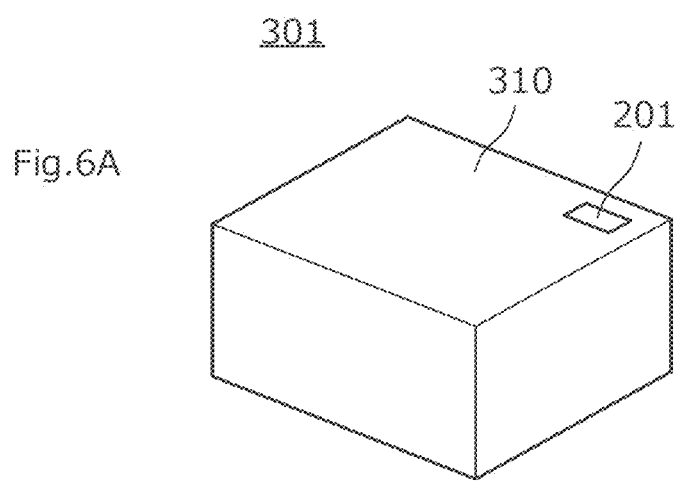
FIG. 6A is a perspective view of an article 301 according to the second exemplary embodiment.

FIG. 6A is a perspective view of an article 301 according to the second exemplary embodiment. The article 301 is configured with an insulating member 310 at least whose surface is insulating; and an RFID tag 201 attached to the insulating member 310. The configuration of the RFID tag 201 is the same as that described above.

Figure 6B:
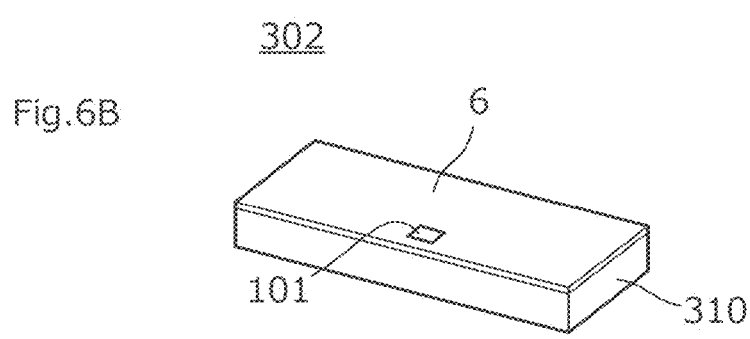
FIG. 6B is a perspective view of an article 302 according to the second exemplary embodiment.

FIG. 6B is a perspective view of an article 302 according to the second embodiment. The article 302 is configured with an insulating member 310; a planar conductor 6 formed on the surface of the insulating member 310; and an RFIC module 101 provided on the surface of the planar conductor 6. The relationship between the RFIC module 101 and the planar conductor 6 is the same as that illustrated in FIGS. 4, 5A, and 5B, as discussed above.

Third Exemplary Embodiment

A third exemplary embodiment exemplifies an RFIC module characterized in a configuration of the stacked coil.

Figure 7:
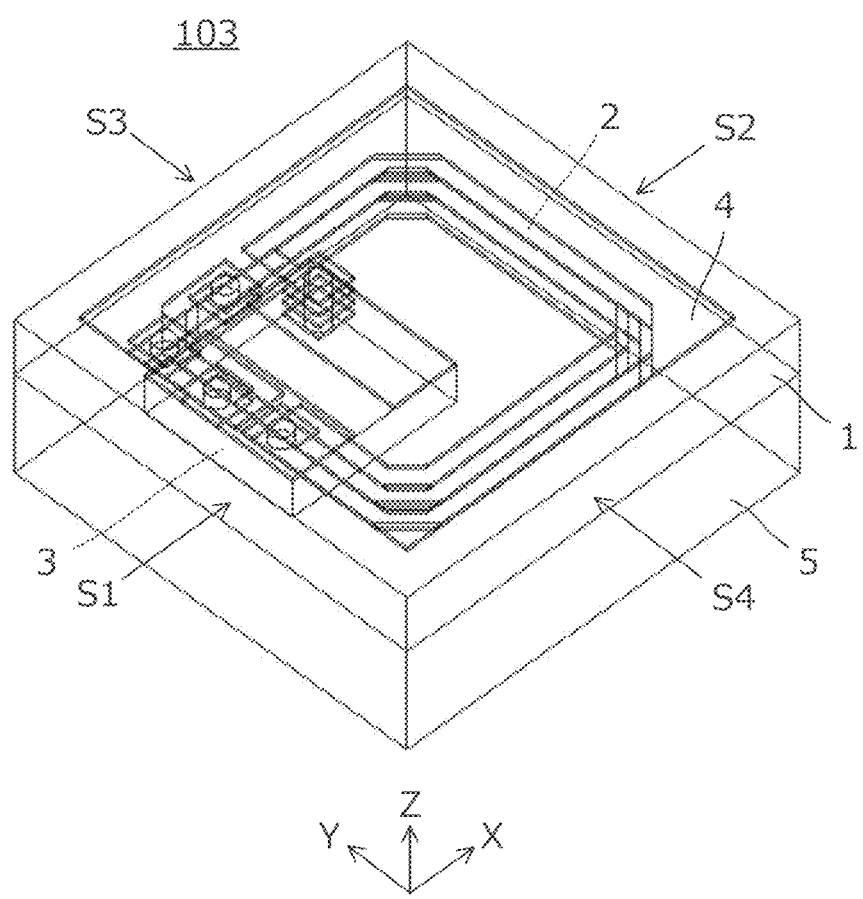
FIG. 7 is a perspective view of an RFIC module 103 according to a third exemplary embodiment.
Figure 8:
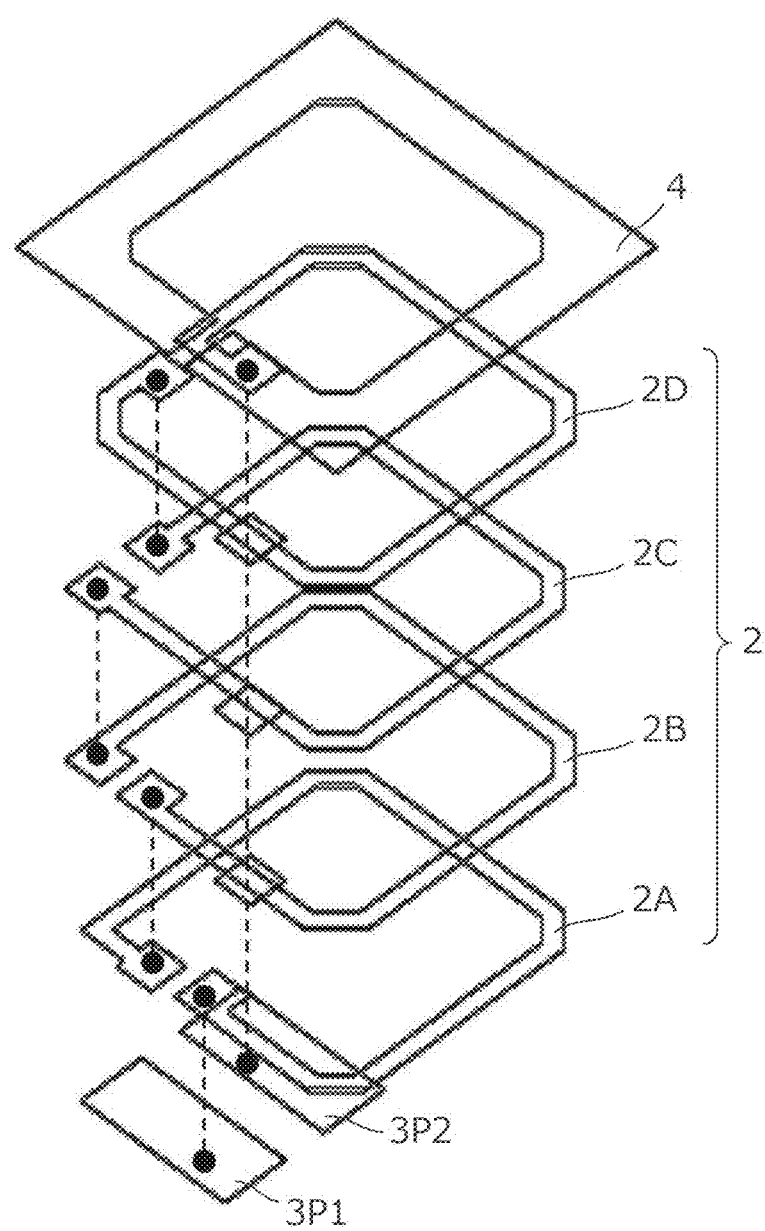
FIG. 8 is an exploded perspective view of conductor portions inside the RFIC module 103 according to the third exemplary embodiment.

FIG. 7 is a perspective view of an RFIC module 103 according to the third embodiment, and FIG. 8 is an exploded perspective view of conductor portions inside the RFIC module 103. FIG. 7 illustrates the internal structure in a see-through manner.

The RFIC module 103 includes an insulating substrate 1 having a cuboid shape; a stacked coil 2 formed of a conductor pattern, on the insulating substrate 1; an RFIC 3 mounted on the insulating substrate 1; and a planar coil 4 formed on the insulating substrate 1.

According to an exemplary aspect, the dimensions of the width W, the depth D, and the height H of the insulating substrate 1 are as follows in this example:

W: 1.2 mm
D: 1.2 mm
H: 0.165 mm

Further, the entire height including the plastic mold material layer 5 is 0.465 mm in an exemplary aspect. As shown above, the RFIC module is very small as a whole.

As shown in FIGS. 7 and 8, there are formed, inside the insulating substrate 1, a stacked coil 2 configured with conductor patterns 2A to 2D formed into four layers and with via conductors. The conductor patterns 2A to 2D are formed along a first side surface S1, a second side surface S2, a third side surface S3, and a fourth side surface S4 of the insulating substrate 1. The broken lines represent the via conductors.

One end of the conductor pattern 2A is connected to a mounting electrode 3P1 for the RFIC 3 via a via conductor. One end of the conductor pattern 2D is connected to a mounting electrode 3P2 for the RFIC 3 via a plurality of via conductors.

The inner and outer diameters of the conductor patterns 2A and 2C are slightly smaller than the inner and outer diameters of the conductor patterns 2B and 2D, and the four conductor patterns 2A to 2D do not completely overlap each other, but partially overlap in a plan view of the insulating substrate 1. Therefore, even if there is a shift among the formation positions of the conductor patterns 2A to 2D (e.g., a stacking error among the stacked layers of the insulating substrate 1), the shift does not affect much. For example, the outer diameter of the conductor patterns 2A and 2C has an intermediate value between the outer diameter and the inner diameter of the conductor patterns 2B and 2D.

Moreover, the planar coil 4 has an opening diameter substantially equal to the inner diameters of the conductor patterns 2A to 2D. Therefore, a path of a current flowing through the conductor patterns 2A to 2D substantially coincides with the path of the eddy current flowing along the inner edge of the opening of the planar coil 4. Therefore, the stacked coil 2 and the planar coil 4 are strongly electromagnetically coupled.

Fourth Exemplary Embodiment

A fourth exemplary embodiment exemplifies an RFIC module including a capacitor connected to the stacked coil.

Figure 9:
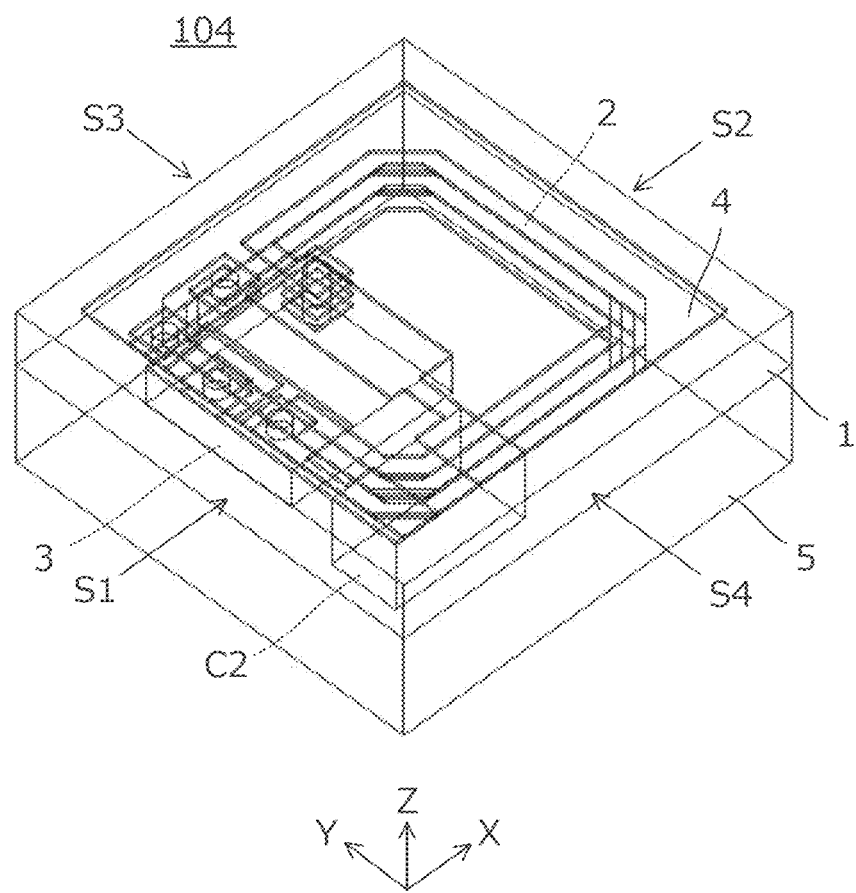
FIG. 9 is a perspective view of an RFIC module 104 according to a fourth exemplary embodiment.
Figure 10:
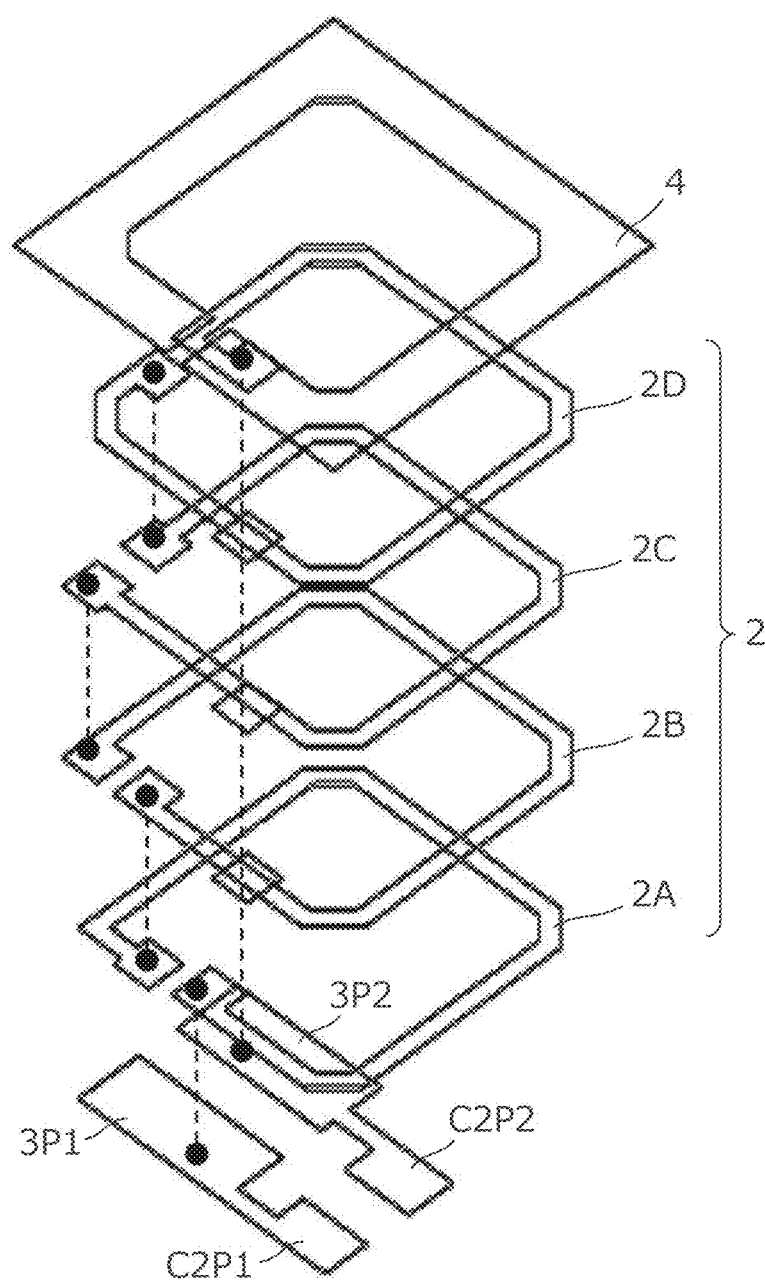
FIG. 10 is an exploded perspective view of conductor portions inside the RFIC module 104 according to the fourth exemplary embodiment.

FIG. 9 is a perspective view of an RFIC module 104 according to the fourth embodiment, and FIG. 10 is an exploded perspective view of conductor portions inside the RFIC module 104. FIG. 9 illustrates the internal structure in a see-through manner.

The RFIC module 104 includes an insulating substrate 1 having a cuboid shape; a stacked coil 2 formed of a conductor pattern, on the insulating substrate 1; an RFIC 3 mounted on the insulating substrate 1; and a planar coil 4 formed on the insulating substrate 1.

In the present embodiment, a capacitor C2 in a chip shape is mounted on the first planar surface of the insulating substrate 1 (e.g., the lower surface of the insulating substrate 1 in the direction shown in FIG. 9). With reference to FIG. 10, mounting electrodes C2P1 and C2P2 for the capacitor are respectively formed continuously to the mounting electrodes 3P1 and 3P2 for the RFIC 3. The other components are configured similarly to those of the RFIC module 103 described in the third exemplary embodiment.

Figure 11:
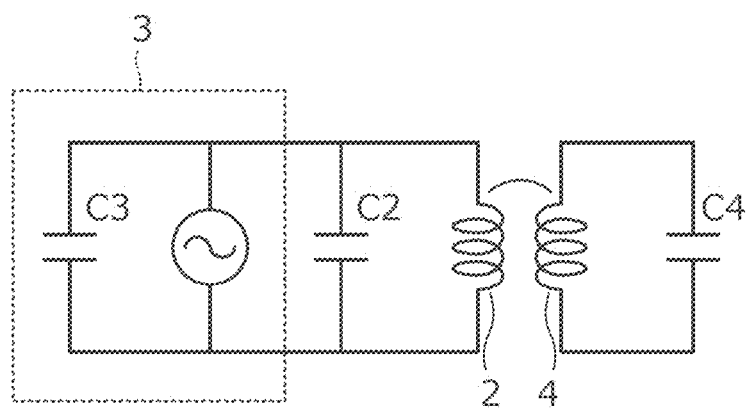
FIG. 11 is an equivalent circuit diagram of the RFIC module 104.

FIG. 11 is an equivalent circuit diagram of the RFIC module 104. The RFIC 3 is depicted by a power supply circuit and a capacitor C3 parallel-connected to the power supply circuit. The RFIC 3 is connected to the stacked coil 2, and the capacitor C2 is parallel-connected to the stacked coil 2. The stacked coil 2, the capacitor C3 of the RFIC 3, and externally attached capacitor C2 constitute a first resonance circuit. Moreover, a second resonance circuit is configured with inductance generated in the planar coil 4 and capacitance generated in the open portion 4OP. In addition, the stacked coil 2 and the planar coil 4 are electromagnetically coupled. Further, the first resonance circuit is coupled to the second resonance circuit.

In the present embodiment, when the capacitance of the capacitor C3 included in the RFIC 3 is less than a specified capacitance, the resonance frequency of the first resonance circuit can be set to a predetermined frequency by externally attaching the capacitor C2 having a predetermined capacitance.

Fifth Exemplary Embodiment

A fifth exemplary embodiment exemplifies an RFIC module including a capacitor connected to the stacked coil.

Figure 12:
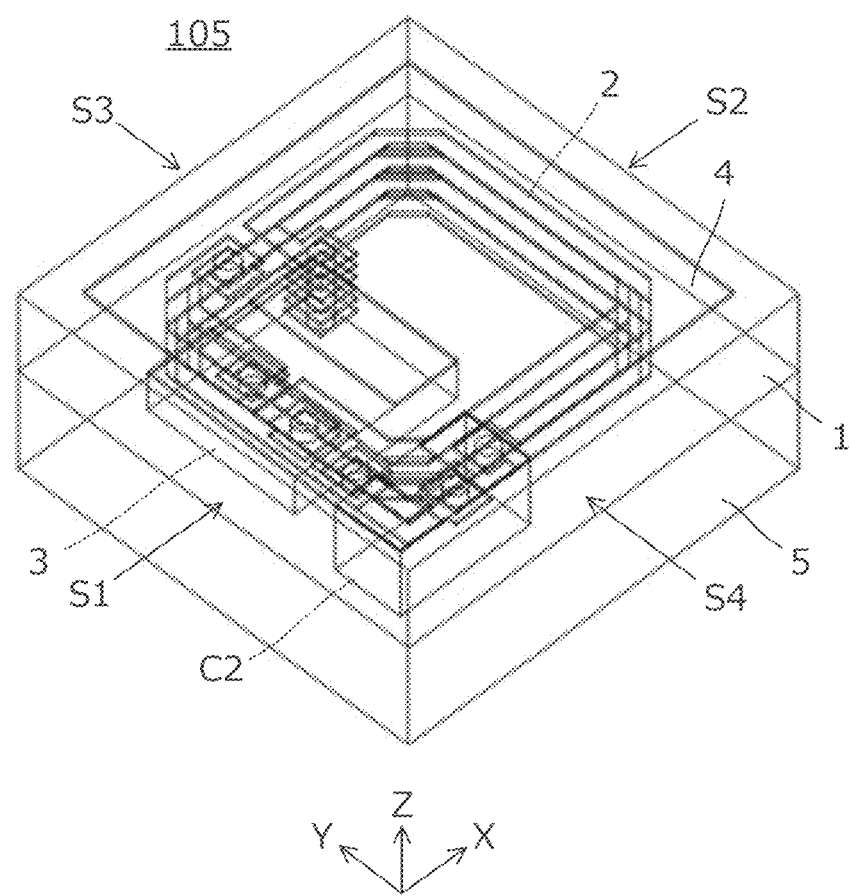
FIG. 12 is a perspective view of an RFIC module 105 according to a fifth exemplary embodiment.
Figure 13:
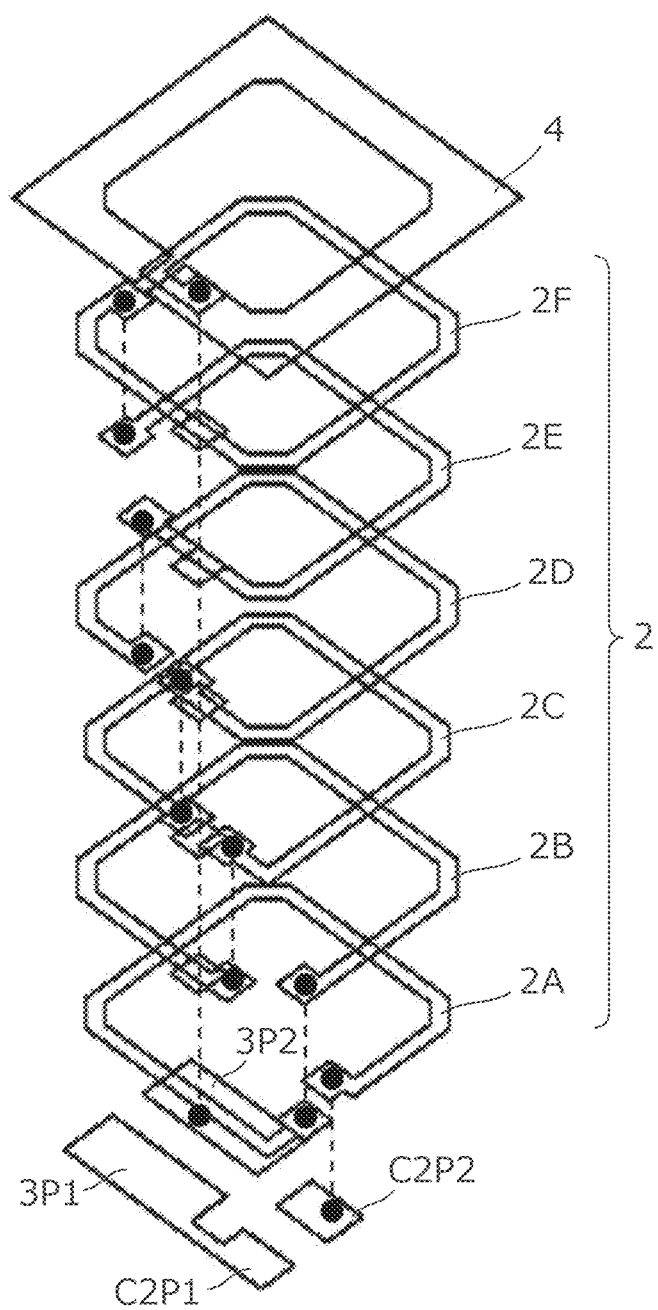
FIG. 13 is an exploded perspective view of conductor portions inside the RFIC module 105 according to the fifth exemplary embodiment.

FIG. 12 is a perspective view of an RFIC module 105 according to the fifth embodiment, and FIG. 13 is an exploded perspective view of conductor portions inside the RFIC module 105. FIG. 12 illustrates the internal structure in a see-through manner.

The RFIC module 105 includes an insulating substrate 1 having a cuboid shape; a stacked coil 2 formed of a conductor pattern, on the insulating substrate 1; an RFIC 3 mounted on the insulating substrate 1; a capacitor C2 mounted on the insulating substrate 1; and a planar coil 4 formed on the insulating substrate 1.

As shown in FIG. 13, there are formed, inside the insulating substrate 1, a stacked coil 2 configured with conductor patterns 2A to 2F formed into six layers and with via conductors. One end of the conductor pattern 2A is connected to a mounting electrode C2P2 for the capacitor C2 via a via conductor. One end of the conductor pattern 2F is connected to a mounting electrode 3P2 for the RFIC 3 via a plurality of via conductors. A mounting electrode C2P1 for the capacitor C2 is formed continuously to a mounting electrode 3P1 for the RFIC 3. The other components are configured similarly to those of the RFIC module 103 described in the third embodiment and the RFIC module 104 described in the fourth exemplary embodiment.

Figure 14:
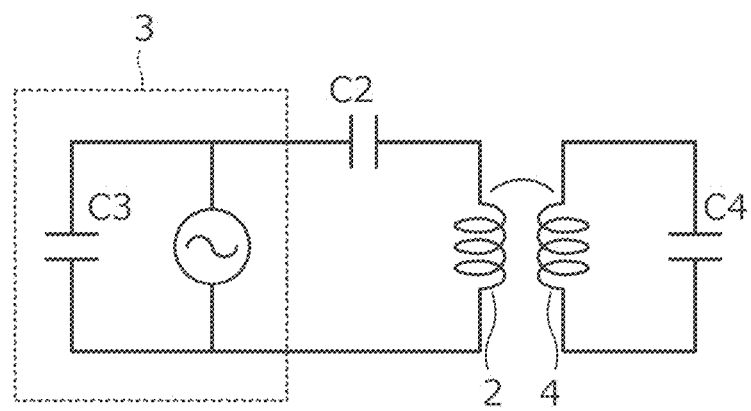
FIG. 14 is an equivalent circuit diagram of the RFIC module 105.

FIG. 14 is an equivalent circuit diagram of the RFIC module 105. The RFIC 3 is depicted by a power supply circuit and a capacitor C3 parallel-connected to the power supply circuit. The capacitor C2 is series-connected to the stacked coil 2. The RFIC 3 is connected to a series circuit of the stacked coil 2 and the capacitor C2. In this exemplary aspect, the stacked coil 2, the capacitor C3 of the RFIC 3, and externally attached capacitor C2 form a first resonance circuit. A second resonance circuit is configured with inductance generated in the planar coil 4 and capacitance generated in the open portion 4OP. In addition, the stacked coil 2 and the planar coil 4 are electromagnetically coupled. Further, the first resonance circuit and the second resonance circuit are coupled to each other.

In the present embodiment, when the capacitance of the capacitor C3 included in the RFIC 3 is more than a specified capacitance, the resonance frequency of the first resonance circuit can be set to a predetermined frequency by externally attaching the capacitor C2 having a predetermined capacitance.

Sixth Exemplary Embodiment

A sixth exemplary embodiment describes an RFID tag including a planar conductor different from the example described in the second embodiment.

Figure 15A:
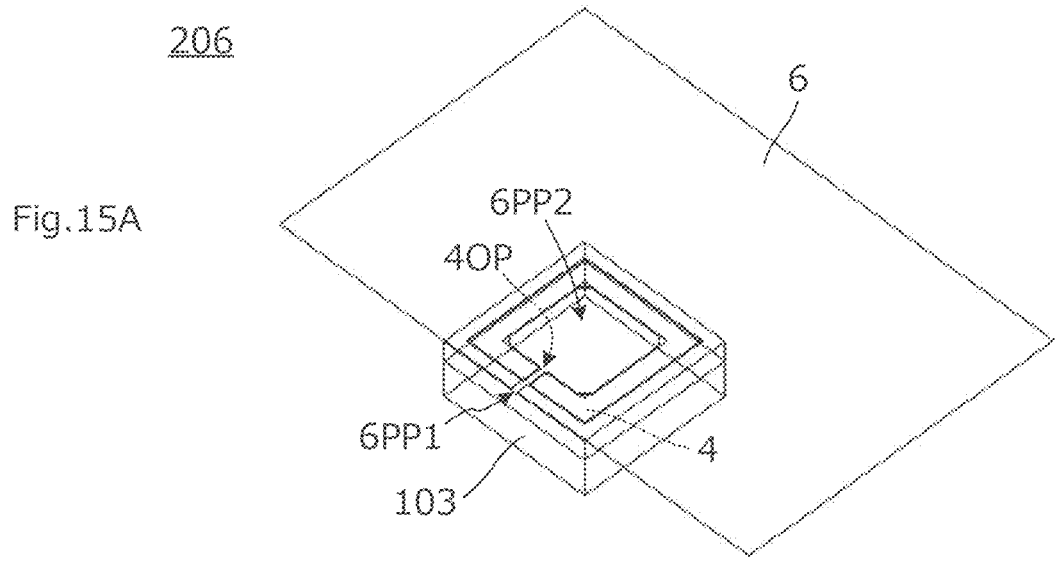
FIG. 15A is a perspective view of an RFID tag 206 according to a sixth exemplary embodiment.
Figure 15B:
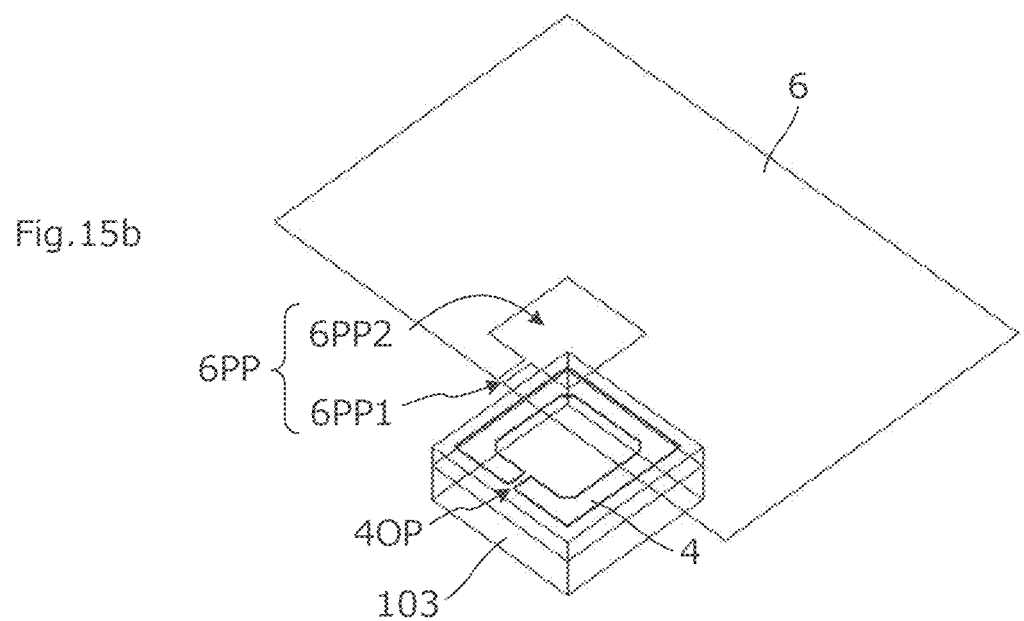
FIG. 15B is an exploded perspective view of the RFID tag 206.

FIG. 15A is a perspective view of an RFID tag 206 according to the sixth embodiment, and FIG. 15B is an exploded perspective view of the RFID tag 206. The RFID tag 206 is configured with an RFIC module 103 and a planar conductor 6. FIGS. 15A and 15B show the planar conductor 6 in a see-through manner.

As shown in FIG. 15B, the planar conductor 6 has a recess 6PP. The recess 6PP is configured with a recess 6PP1 having a smaller width and being recessed inward from an outer edge of the planar conductor 6; and a recess 6PP2 having a larger width inside.

As shown in FIG. 15A, in a plan view of the RFIC module 103, an open portion 4OP of a planar coil 4 overlaps the recess 6PP1 of the planar conductor 6. In addition, a coil opening of the planar coil 4 and the recess 6PP2 of the planar conductor 6 have substantially the same size and overlap each other. In an exemplary aspect, the planar coil 4 is bonded to the planar conductor 6 by soldering or via a conductive bonding material.

In the example described in FIG. 5, the width of the recess 6PP of the planar conductor 6 is constant. However, as described in the present embodiment, the recess 6PP may have a shape whose width is smaller at a part in contact with the outer edge of the planar conductor 6. With that arrangement, the bonding length between the recess 6PP of the planar conductor 6 and the planar coil 4 is substantially equal to the perimeter of the planar coil 4.

In the present embodiment, since the bonding area between the planar coil 4 and the planar conductor 6 illustrated in FIGS. 15A and 15B can be increased, a high fixing strength can be obtained between the planar coil 4 and the planar conductor 6. Therefore, the chance of the RFIC module 103 falling off due to an external impact can also be reduced.

Finally, it is noted that the description of the above-described exemplary embodiments is illustrative in all respects and is not restrictive. Modifications and changes can be made as appropriate by those skilled in the art.

For example, the communication frequency is not limited to the 900 MHz band, and can be similarly applied to other frequency bands, such as the 2.45 GHz band, in alternative aspects.

Each of the above-described exemplary embodiments has described the example in which the stacked coil 2 and the planar coil 4 overlap each other when viewed in a direction perpendicular to the first planar surface P1 of the insulating substrate 1. However, the stacked coil 2 and the planar coil 4 may be configured to partially overlap each other. In addition, the inner and outer diameters of the stacked coil 2 and the planar coil 4 only have to be similar to each other.

REFERENCE SIGNS LIST

C2, C3, C4 capacitor
C2P1, C2P2 mounting electrode for capacitor

CO coil opening
P1 first planar surface
P2 second planar surface
S1 first side surface
S2 second side surface
S3 third side surface
S4 fourth side surface
V1, V2, V3 via conductor
1 insulating substrate
2 stacked coil
2A to 2F conductor pattern
3 RFIC
3P1, 3P2 mounting electrode for RFIC
4 planar coil
4OP open portion
5 plastic mold material layer
6 planar conductor
6PP, 6PP1, 6PP2 recess
101, 103, 104, 105 RFIC module
201, 206 RFID tag
301, 302 article
310 insulating member

The invention claimed is:

1. A radio frequency integrated circuit (RFIC) module comprising:
 an insulating substrate having a cuboid shape and including first and second side surfaces that are parallel to a Y-axis direction that is perpendicular to an X-axis direction, third and fourth side surfaces that are parallel to the X-axis direction, and first and second planar surfaces that are parallel to the X-axis and Y-axis directions;
 a stacked coil configured with conductor patterns that are formed in a plurality of layers in the insulating substrate and along the first, second, third and fourth side surfaces of the insulating substrate;
 a radio frequency integrated circuit (RFIC) mounted on the first planar surface of the insulating substrate; and
 a planar coil disposed on the second planar surface of the insulating substrate and that has an open portion with a cut out shape, with the planar coil overlapping the stacked coil when viewed in a direction perpendicular to the first planar surface of the insulating substrate,
 wherein the stacked coil is connected to the RFIC,
 wherein the RFIC is disposed at a position closer to the first side surface than to the second side surface and closer to the third side surface than to the fourth side surface,
 wherein a part of the RFIC overlaps the stacked coil when viewed in the direction perpendicular to the first planar surface of the insulating substrate, and
 wherein the open portion of the planar coil is disposed at a position closer to the first side surface than to the second side surface.

2. The RFIC module according to claim 1, wherein the conductor patterns of the stacked coil formed in the plurality of layers partially overlap each other when viewed in the direction perpendicular to the first planar surface of the insulating substrate.

3. The RFIC module according to claim 1, wherein inductance generated in the planar coil and capacitance generated in the open portion form a resonance circuit.

4. The RFIC module according to claim 3, wherein the RFIC module comprises a capacitor connected to the stacked coil and forms a part of the resonance circuit together with the stacked coil.

5. The RFIC module according to claim 1, further comprising a pair of mounting electrodes disposed on the first planar surface of the insulating substrate, with the RFIC coupled thereto.

6. The RFIC module according to claim 5, wherein the pair of mounting electrodes are coupled to respective conductor patterns of the stacked coil by a pair of via conductors.

7. The RFIC module according to claim 1, further comprising a plastic mold material layer disposed on the first planar surface of the insulating substrate and that covers the RFIC.

8. A radio frequency identification (RFID) tag comprising:
 the RFIC module according to claim 1; and
 a planar conductor partially having a recess with a cut out shape in a planar direction,
 wherein the open portion of the planar coil overlaps the recess of the planar conductor when viewed in the direction perpendicular to the first planar surface of the insulating substrate.

9. The RFID tag according to claim 8, wherein the recess of the planar conductor has a first recess that is disposed inward from an outer edge of the planar conductor and a second recess disposed inward from the first recess, with the second recess having a larger width than the first recess.

10. The RFID tag according to claim 9, wherein the open portion of the planar coil overlaps the second recess of the planar conductor.

11. The RFID tag according to claim 10, wherein a coil opening of the planar coil overlaps the second recess of the planar conductor and has a substantially same size thereto.

12. The RFID tag according to claim 8, wherein the conductor patterns of the stacked coil formed in the plurality of layers partially overlap each other when viewed in the direction perpendicular to the first planar surface of the insulating substrate.

13. The RFID tag according to claim 8, wherein inductance generated in the planar coil and capacitance generated in the open portion form a resonance circuit.

14. The RFID tag according to claim 13, wherein the RFIC module comprises a capacitor connected to the stacked coil and forms a part of the resonance circuit together with the stacked coil.

15. The RFID tag according to claim 8, wherein the RFIC module further comprises a pair of mounting electrodes disposed on the first planar surface of the insulating substrate, with the RFIC coupled thereto.

16. The RFID tag according to claim 15, wherein the pair of mounting electrodes are coupled to respective conductor patterns of the stacked coil by a pair of via conductors.

17. The RFID tag according to claim 8, wherein the RFIC module further comprise a plastic mold material layer disposed on the first planar surface of the insulating substrate and that covers the RFIC.

18. An article comprising:
 the RFIC module according to claim 1; and
 a planar conductor that partially has a recess in a cut out shape in a planar direction,
 wherein the open portion of the planar coil overlaps the recess of the planar conductor when viewed in the direction perpendicular to the first planar surface of the insulating substrate.

19. The article according to claim 18, wherein the recess of the planar conductor has a first recess that is disposed inward from an outer edge of the planar conductor and a second recess disposed inward from the first recess, with the second recess having a larger width than the first recess.

20. The article according to claim 19, wherein the open portion of the planar coil overlaps the second recess of the planar conductor, and a coil opening of the planar coil overlaps the second recess of the planar conductor and has a substantially same size thereto.

\* \* \* \* \*